United States Patent [19]

Simnovec

[11] Patent Number: 4,621,375

[45] Date of Patent: Nov. 4, 1986

[54] REMOTE CONTROL SYSTEM FOR CONSTRUCTIONAL MACHINERY

[75] Inventor: Andrej Simnovec, Recklinghausen, Fed. Rep. of Germany

[73] Assignee: Friedrich Wilh. Schwing GmbH, Herne, Fed. Rep. of Germany

[21] Appl. No.: 559,938

[22] Filed: Dec. 9, 1983

[30] Foreign Application Priority Data

Jan. 8, 1983 [EP] European Pat. Off. ........ 83100108.6

[51] Int. Cl.⁴ ................................................ H04B 9/00

[52] U.S. Cl. ...................................... 455/603; 318/16; 455/127; 455/352

[58] Field of Search .................... 318/16, 17; 455/352, 455/353, 603, 612, 95, 100, 127, 343; 340/825.18, 825.69

[56] References Cited

U.S. PATENT DOCUMENTS

| | | | |
|---|---|---|---|
| 2,886,750 | 5/1959 | Vogel | 318/16 |
| 3,136,385 | 6/1964 | Gitel | 318/16 |
| 3,263,141 | 7/1966 | Nicola | 318/16 |
| 3,454,927 | 7/1969 | Dame et al. | 318/16 |
| 3,463,327 | 8/1969 | Lester | 318/16 |
| 3,513,443 | 5/1970 | Anderson | 455/603 |
| 3,829,782 | 8/1974 | Dillman et al. | 455/127 |
| 4,471,492 | 9/1984 | Mann et al. | 455/127 |

FOREIGN PATENT DOCUMENTS 1368211 9/1974 United Kingdom ................ 455/352

OTHER PUBLICATIONS

Alessi—"A Negative Ion Sputter"—Nuclear Instruments and Methods 147 #2, 1977 North-Holland Pub. Co., pp. 305-312.

*Primary Examiner*—Joseph A. Orsino, Jr.
*Attorney, Agent, or Firm*—Price, Heneveld, Huizenga & Cooper

[57] ABSTRACT

For the remote control of construction machinery, more specially in the form of the distribution mast or boom of a concrete pump, in the invention a transmission system has a radio remote control unit whose control transmitter and receiver are joined up with the command unit and with the distributor for the solenoid valves respectively by respective plug contact connector means. The transmission mode is one using digitally encoded RF messages so that for each control function two part-messages are continuously transmitted after the connections have been made, such messages each being made up of a bit representative of the function, of address information and of a parity bit for security, and mirroring the condition of the circuits of the command unit. The receiver has a RF receiving part, a central process controller and a relay part or a D/A converter.

4 Claims, 7 Drawing Figures

Transmitter(supported on abdomen of user)

REMOTE CONTROL SYSTEM FOR CONSTRUCTIONAL MACHINERY

BACKGROUND OF THE INVENTION

The present invention is with respect to remote control systems for constructional machinery, more specially in the form of concrete pumps with a distribution mast, making use of a portable console for use as a command controller and having a number of circuits which have switches for producing different control functions and furthermore are each joined with a multi-contact connector. There is furthermore a transmitter means and a receiver means which has an electrical distributor for the operation of solenoid valves and a plug connector for transmission means.

In the prior art concrete pumps, forming the preferred field of use of the present invention, have as a rule been controlled by changing their speed of turning so that the rate of concrete supply may be changed to be in keeping with filling up of the formwork with concrete and furthermore the direction of pumping is reversible so that the supply pipe may be not only be filled with concrete at the start of an operation but at the end of the operation it may be cleared of concrete. The distribution mast is mostly mounted on a column with a turntable or the like and made up of different sections that are able to be folded and hinged by hydraulic drives, more specially in the form of rams, independently of each other so that concrete coming out of the top end of mast may be supplied at different points at different levels and with different horizontal distances therebetween. Although the invention may be used in connection with other construction machinery with a greater or smaller number of control functions, as for example earth moving machines and more specially excavators, the present account of the invention is limited to the preferred use, that is to say in connection with concrete pump systems.

Known radio remote control systems with wireless transmission of the control commands are generally based on pulse modulation. In this case the receiver fitted on the construction machine is responsible for supplying the necessary control voltage as the output signal. In this respect trouble through interference from other plant is likely, more specially from other radio signals and furthermore as is caused by strong magnetic fields, that are produced near high voltage distribution lines because of their field strength. The outcome of such interference may well be uncontrolled motion of the boom or mast so that workers are put in danger and materials are likely to be damaged. Radio control systems using transmission by digitally encoded RF messages or alternatively signal transmission with light guides have been put forward in the prior art at some time and may take care of such shortcomings. However in their present form they are not such that they might be used with constructional machinery.

On the other hand remote controls with a multi-core cable as a transmission connection have come to be used on a large scale for construction machinery, more specially in the more limited field of the present invention. Such cables are joined up with the controller for generating the commands and with the receiver means using multi-contact connectors. This may be said to be the starting point of the present invention. Such known remote control systems have been selected more specially because one may be certain that no undesired commands are generated or transmitted. Generally the cable has one channel or core for each control function. However under certain working conditions such systems have serious shortcomings.

Because the machine operator is not able to keep to one position in relation to the machine he is controlling and has to take the command generator round with him, the cable will necessarily be dragged through buildings and the like. In the case of rough conditions on the building site the cable will then have to be taken through and past many obstacles, as for example open shafts in the building, windows, staircases and like parts of the structure if the machine operator is to be able to take up a position in which full observation of the concreting operation is possible. Furthermore his life will be in danger if for example the distribution mast, that has a large range of motion, is being moved about near high voltage lines where there is some chance of discharge of electricity thereto.

GENERAL OVERVIEW OF THE PRESENT INVENTION

One purpose of the invention is to make such a further, simple development of remote controls of the sort as used in the prior art that the mode of transmission may be selected to be in keeping with changing working conditions.

A further purpose of the invention is to make it possible for the remote control system to be adapted to be in line with given working conditions better than has so far been the case, as for example to make certain that the machine operator is not in danger when the machine is working near high voltage lines or like obstacles.

For effecting these and further pruposes the transmission means of the remote controller may be selectively used and comprises a transmitter and a receiver, said transmitter and said receiver being joined up with the command unit and with the distributor for the solenoid valves respectively by respective plug contact connector means, said remote control system having a transmission mode one using digitally encoded RF messages such that for each control function two-part messages are continuously transmitted after the connections have been made, such messages each having a bit representative of the desired one of a number of said functions, address information and a parity bit for security and mirroring the condition of the circuits of the command unit, said receiver having a RF receiving part, a central process controller and a relay part and a D/A converter respectively.

The invention makes it possible for the place of the multi-core cable to be taken by the radio link controller, if, by not having any transmission cable between the command unit and the electrical distributor, the machine operator is safer or the operation of the construction machine is much simpler or more efficient. The selected more of radio remote control gives greater freedom from accidents otherwise likely with transmitters with radio control channels near a construction site, inasfar as such danger is not possible with message encoding and because further operation of the machine by way of the cable will be possible even if there is an interferring transmission on the same carrier frequency. The invention makes these useful effects possible using normal systems and units, it only being a question of replacing the electric cable for all or some of the operation time while the other parts of the system go on being used so that for example the command unit, that is likely to be high in price, and the electrical distributor, that makes the connection with the solenoid valves, do not have to be changed. The freedon from interfering effects, that are the cause of trouble conditions with known radio control systems, is made possible in the invention by the special mode of transmission.

If interference is so heavy that radio contact is hardly possible, it is possible in keeping with a further part of the present invention for transmission to be by way of a preferred multi-channel light guide transmitter in the transmitter and a light guide receiver in the receiver joined together by light guide cable. Such a link may readily be laid and will not be damaged by contact with high voltage systems.

In the invention the transmitter may have its own separate portable power supply with a unit for monitoring the voltage level and the receiver may have a power supply with a voltage monitoring unit. In this respect the act of electrically joining up the transmitter and of the receiver with their power supplies is responsible for messages to be continuously transmitted, such messages mirroring the condition of the command unit; such transmission comes to an end however once the voltage monitoring units have sensed an overly low voltage lever, that is to say one under the level needed for safe transmission.

Further details and useful effects of the present invention will be seen from the account now to be given of one working example thereof using the figures herein.

LIST OF DIFFERENT VIEWS OF THE FIGURES

DETAILED ACCOUNT OF WORKING EXAMPLES OF THE INVENTION

Figure 1:
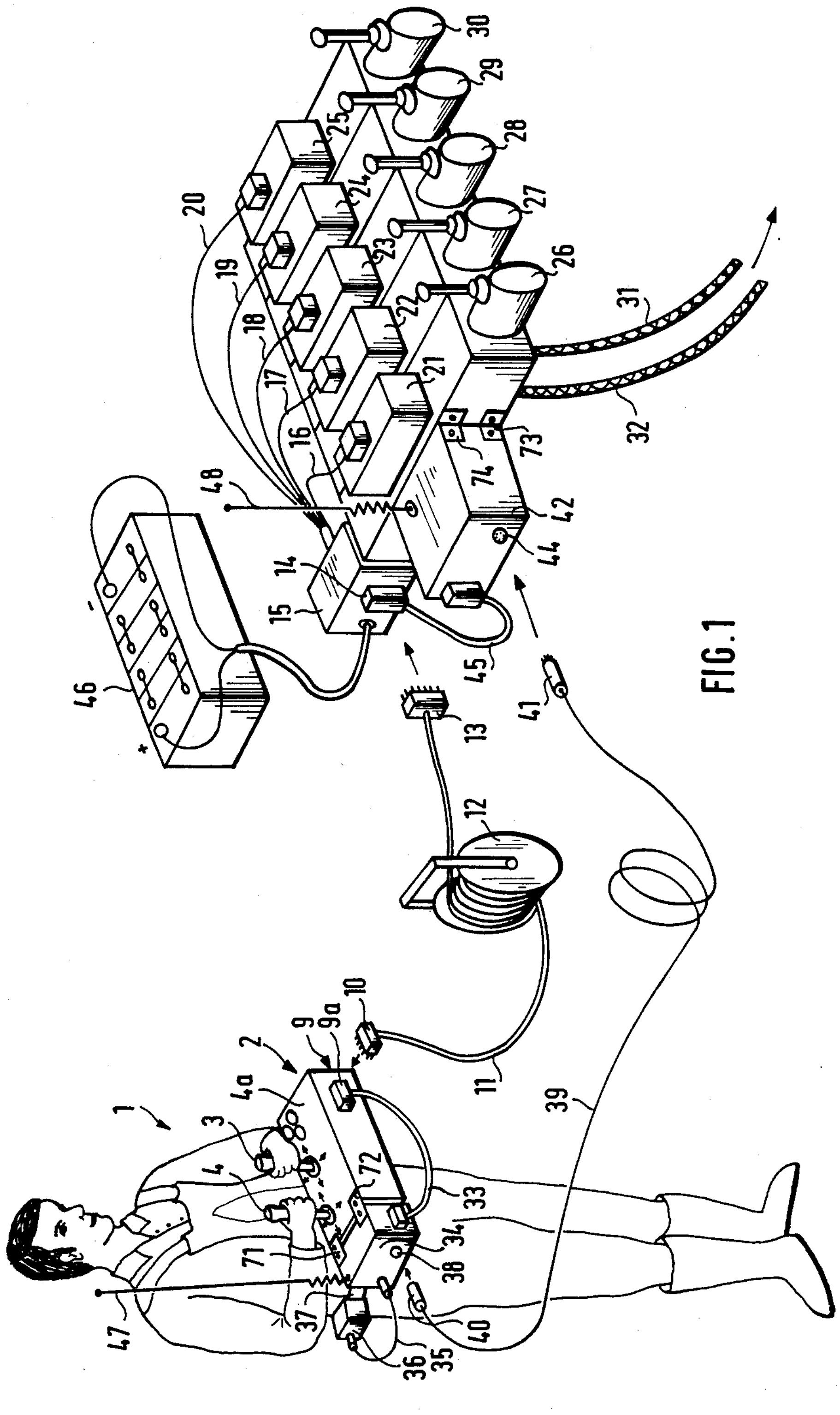
FIG. 1 is a diagrammatic view of the different units of the remote control system of the present invention.
Figure 2:
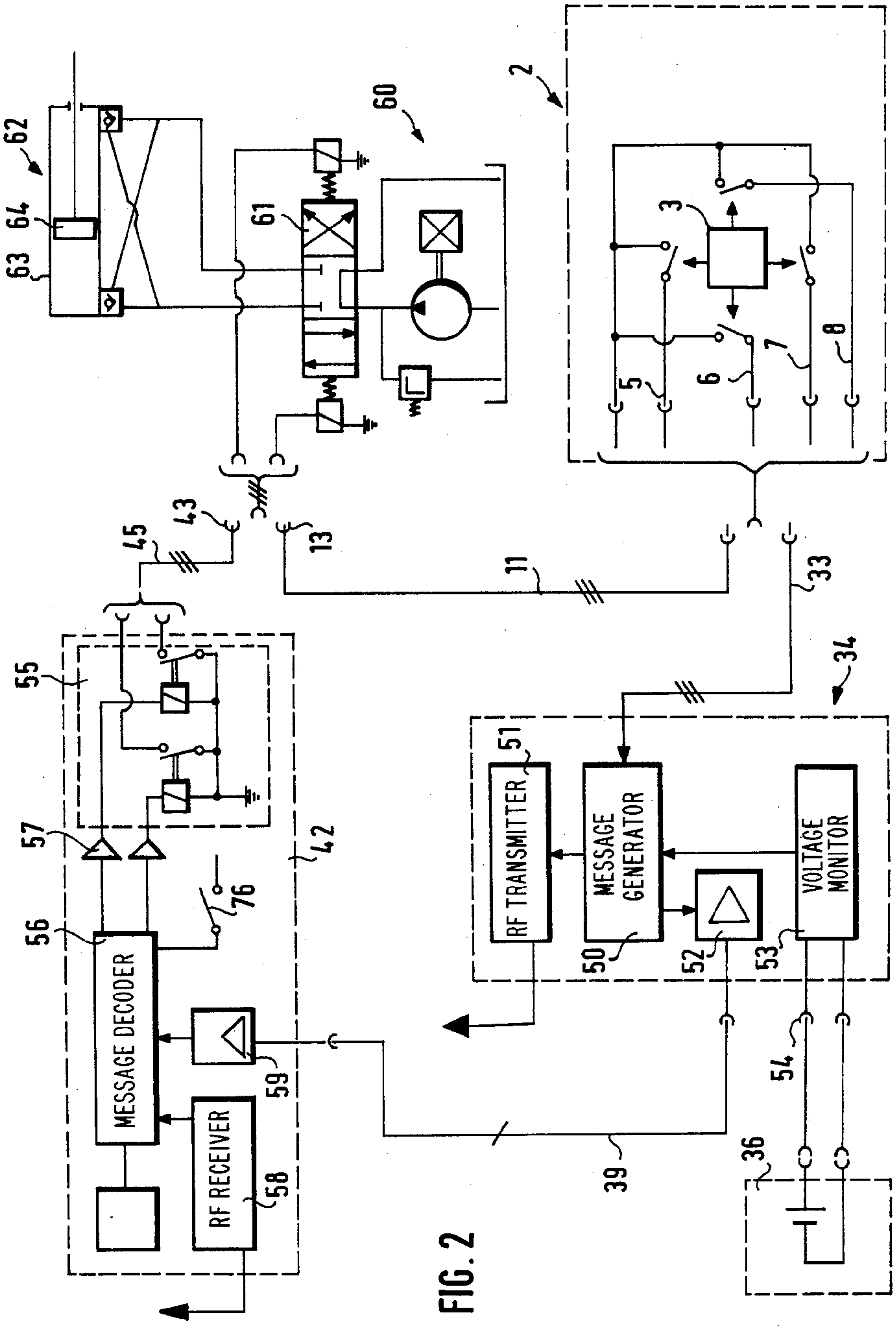
FIG. 2 is a schematic to make clear the first mode of operation of the present invention, the circuit supplying digital pulses as its output signal.
Figure 3:
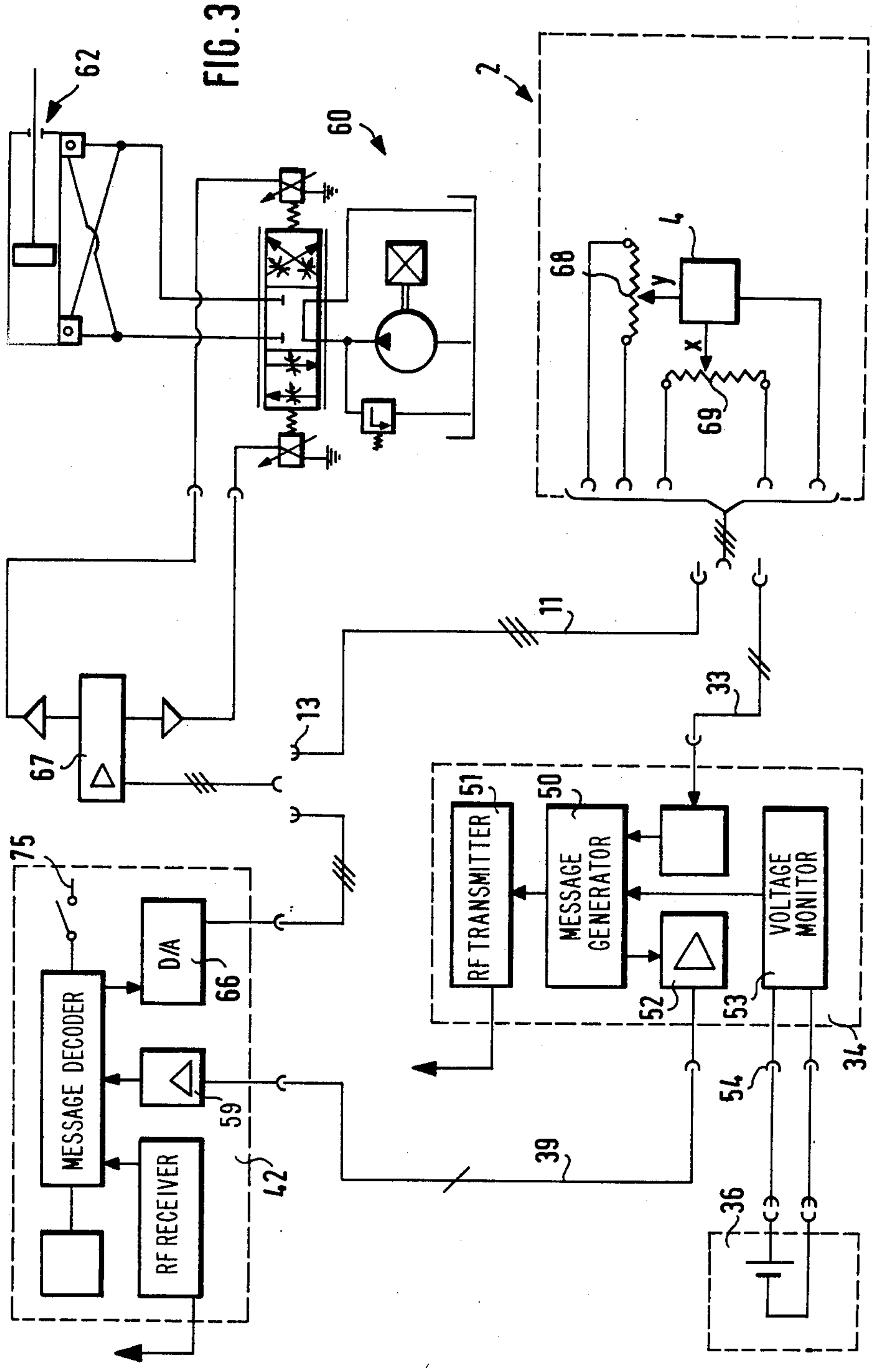
FIG. 3 is a schematic on the same lines as FIG. 2, but with respect to a mode in which analog signals are produced as control pulses.

As the reader will see from FIG. 1 the machine operator 1 has a portable console 2 with one control lever 3 or 4 for each of the control of functions as marked of a construction machine that is not figured and may, for example, be a concrete pump used with distribution mast. On the top wall 4*a* of the console 2 there are markings representative of the different functions to be controlled. In FIGS. 2 and 3 it is only possible to see part of the inside of the console 2, there being in all four circuits 5 to 8 that may be opened or completed by moving one of the control levers 3 or 4 in the arrowed directions so that switches are worked. These circuits come to an end at a plug contact 9, that is fixed on the outer face of the console 2. The plug contact or connector 9 is a multi-core one and may be joined up with a multi-core electrical cable 11, that is rolled up on a cable drum 12, by using a connector 10. The end of this cable has its own multi-channel connector 13 that may be joined up with a multi-channel plug 14 of an electrical distributor 15, having wires or cores 16 to 20 running out from it to solenoid valves 21 to 25. The solenoid valves may be controlled by hand as well, as is marked at 26 to 30. The switching of the hydraulic system is responsible for operation of the controlled object by way of the hydraulic lines that are marked for example at 31 and 32 in FIG. 1.

If the electrical transmission cable 11 is not used, the plus 9*a* with a short connection cable 33 is joined up with a transmitter 34, same being supplied with power by way of a short cable 35 from a battery 36 carried on the belt 37 of the machine operator 1. The transmitter 34 has a connector 38 for the plug contact 40 of a light guide cable 39, whose plug connection 41 makes it possible for the cable 39 to be joined up with a receiver 42, that for its part has a socket 44 therefor. There is a short connection cable 45 for linking the receiver 42 to the distributor 15. The power supply for the distributor is from the battery 46 of a vehicle that is not figured and has the concrete pump with its distribution mast supported thereon.

As is clear from the figure the transmission of the commands from the console 2 is possible using any one of three different modes or ways. One of this ways is normal transmission by way of the electric cable 11, in which case the transmitter 34 and receiver 42 are switched off. The second transmission mode is by way of the transmitter 34 and the receiver 42 using the light guide 39 or by radio using the transmitter antenna 47 and the receiver antenna 48.

Figure 4:
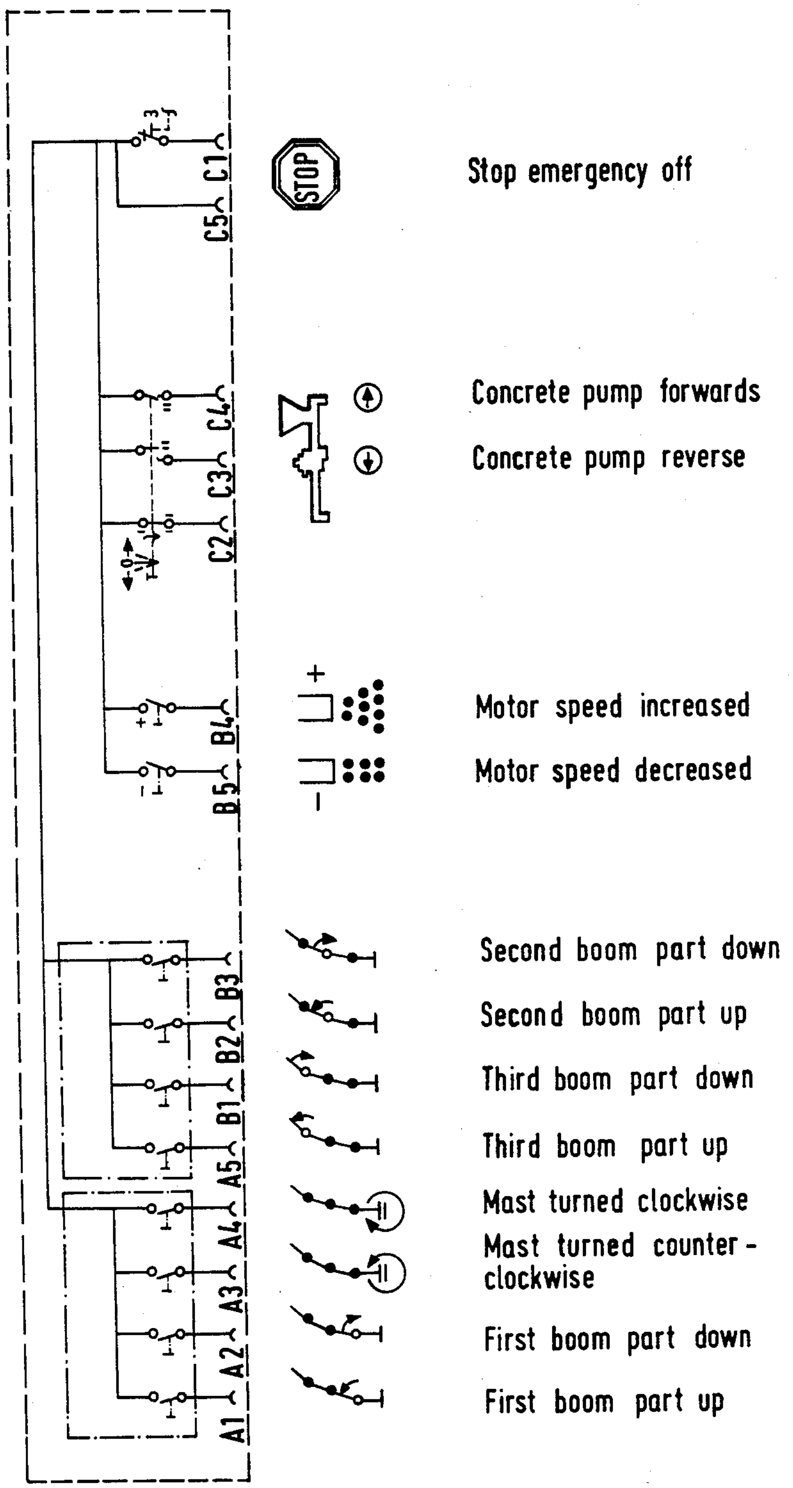
FIG. 4 is a schematic of a fifteen channel concrete pump controller in keeping with the invention.

In FIG. 4 the reader will see the symbols as on the top wall of the portable console 2. Running from the left to the right the symbols are for the operation of the separate boom or mast sections by way of rams, the boom having three such sections and having means for swiveling them. Furthermore the speed of the pump may be decreased or inceased. Next to these symbols there are further symbols for forward and reverse running of the pump as needed for filling and emptying the concrete duct. There is a main switch for turning off the system completely.

The form of the invention to be seen in FIGS. 2 and 3 has at the transmitting end 34 a message generating block, with parity formation, at 50 and a RF transmitting unit 51 joined thereto. It is furthermore joined up with a light guide transmitting unit 52 for use with the light guide cable 39. There is a unit 53 for monitoring the supply voltage and giving a signal when it is under a lower limit. The said outside power supply 36 is joined with the unit by way of a plug connector 54.

At the receiving end 42 the valve block is marked diagrammatically at 61, it having the solenoid valves 21 to 25 for the control of the different separate ram or rotary drives. The receiver 42 has a message decoder 56 joined up by way of the amplifier 57 with the relay output unit 55. The messages are sent to the decoder 56 by way of the RF receiving unit 58 or by way of the light guide receiver 59 that is joined up with the light guide 39 for the input of signals thereto. Furthermore it is possible to see the connection socket of the connection cable 45 at 43, that may be exchaned for the plug 13 of the electrical connection cable 11.

The hydraulic system is marked diagrammatically at 60 and has a 4/3 way valve 61 for supplying fluid to one or the other end as desired of a ram drive 62, hose cylinder 63 has a piston 64 within it. The hydraulic system may be of known design so that no detailed account thereof is necessary here.

While in the working example of the invention to be seen in FIG. 2 there is an output of digital control pulses to the line 45 by way of the relay output block 55, in the further example to be seen in FIG. 3 there is an output of analog signals by way of a converter 66 and an amplifier or controller 67. It is for this reason that the console 2 has potentiometers in place of the switches, some of such potentiometers being marked at 68 and 69 in FIG. 3.

An account will now be given in more detail of the transmission mode of the remote control system in keeping with the present invention.

In the transmitting part or unit the transmission of the control function is in the form of digitally encoded RF messages, there being one bit for each function, such bit being representative of No motion or motion And in addition there is a permanently adjustable address of four bits and a fixed or permanent bit. The information is secured with a parity bit.

Figure 5:
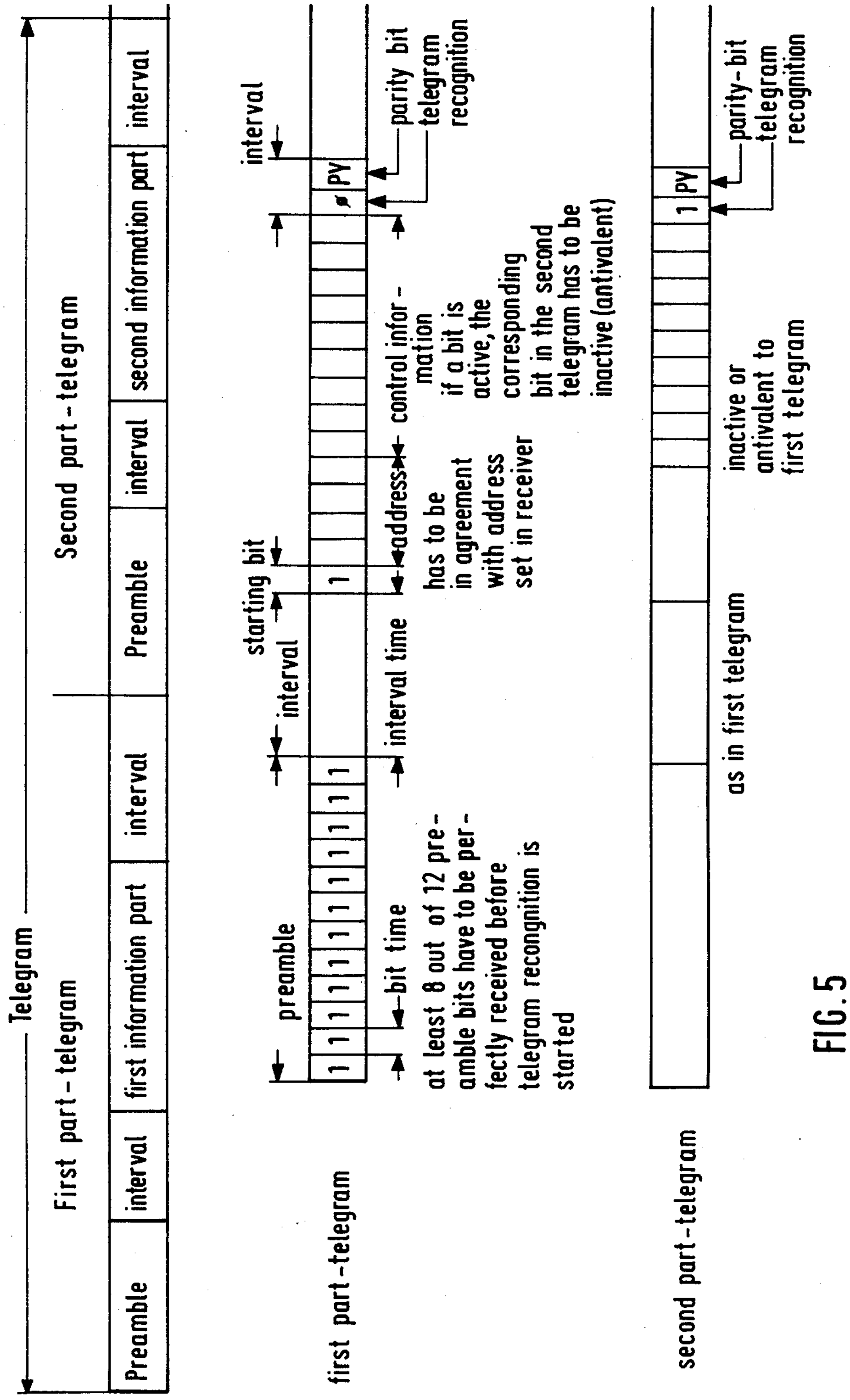
FIG. 5 is a diagram of messages.

For the transmission of all the information two part messages are formed that are to be seen diagrammatically in FIG. 5. The structure of the messages is such that mutually exclusive danger conditions are in each case encoded in the corresponding bit, such conditions being examined in the receiver with respect to antivalence. Furthermore there is an flag bit for a message request, that as well has to be antivalent or exclusive in the sequence of messages; that is to say the bit has to be changed over from one message to the next all the time as long as transmission is going on. This bit is examined in the receiving part as well.

Using lugs 71 and 73 (see FIG. 1) the transmitter may be joined on to the console 2, this being the same in function as the mechanical connection 73 and 74 of the receiver 42 to the distributor 15 or the control block with the solenoid valves 21 to 25. The mechanical linking and doing up of the plug connection at 9 is responsible for starting transmitting operation, as is marked by the switch 75 or the switch 76 in the view of FIGS. 2 and 3. The transmission of messages is kept up continuously and automatically till the transmitter is undone from the console 2 by taking off the connection cable 33. In this respect a message is transmitted every 200 ms. An interruption in transmission of longer that 0.8 second, so that there is a drop out of more than four messages, is responsible for all the functions at the receiver being disabled.

The content of the messages is a continuous representation of the states of the control elements of the control unit, as for example of the states of the control levers 3 and 3*a*.

The voltage monitoring unit 53 as noted in connection with FIG. 2 in the transmitter 34 has the effect of turning off the transmitter 34 at once when the power voltage coming from the power supply 36 goes under a safe or operational lower limit and the transmitter may thereafter only then be put into operation again by joining it up with a fully charged battery. An emergency switch may be worked (see the right hand part of FIG. 4) to put an end at once and permanently to a given transmission operation. The transmitter is cut off from the power supply so that there is no chance of any further transmission taking place.

In addition to its RF receiver part, the receiver futhermore has a central processor control, that is to be seen marked at 56 in FIG. 2. In the relay part 55 there is a relay for each and every function (see FIG. 4), one for each of the bits for each function in a message. In this respect the encoding of the messages, as undertaken in the transmitting part, is so selected that mutually exclusive states have to be antivalent.

The processor control is responsible for decoding the incoming part-messages and putting same together as information messages, the input of such information being bit-serial. In this respect each bit is checked to see that it has the regular length. The preamble bits (see FIG. 5) are separated from the data bits and the intervals between the preamble and the data and between the part-messages and the sequential or following messages are checked. The address encoded in the data bits is taken for comparison with the address set in the receiver, the control data bits of the part messages are checked as to antivalence, the part-messages are checked and the alternation of the flag bits examined.

To make possible recognition of valid information and so make it possible for a control operation to be started, certain conditions have to be kept to, that is to say:

All single bits have to have the right length,

All intervals have to be kept to and the times are not to be shorter or longer than the intervals.

In the case of all messages there is to be continuous recognition of at least eight of twelve preamble bits in all, The trasmitted four-bit digital address has to be in agreement in both messages with the address set at the receiver, The control data bits of the two-part messages have to be antivalent to each other, The part-message marker bit is to have changed over or alternated, and The examination of parity by way of the data bits of the two-part messages is to have been in order, that is to say parity conditions are kept to.

If all these conditions are kept to, the control bit is sent to the relays.

If one of the condiitons is not kept to, the message is not acted upon and the fatal delay time starts to run. If within a time of 0.8 second there is no incoming message pair keeping to the said conditions, all the relays are disabled so that in fact all the functions are stopped. At the same time a second fatal delay time of 30 seconds starts to run and if in this time no messages come in squarely meeting all the conditions and having the information "all control elements in the neutral condition" the receiver is definitely switched off and no further messages are received. Once in this condition, the receiver may only be enabled again by pressing on a key, the transmitter having to be turned off before doing this. In other words, once there has been serious interference of the radio transmission path, the system has to be actively switched on by the user before further use is possible.

The positive monitoring of the power supply voltage with respect to the lower permissible limit thereof makes certain that the processor is positively turned on and off. When it is turned off, all the relays are released.

In the relay contact circuit there is furthermore an emergency switch. Further safety is produced by a safety delay relay that is disabled if the processor has stopped, this being made possible inasfar as the relay is normally kept in the on condition by pulses produced by the processor and when no further pulses come to it or if they do not come to it with the right timing in harmony with the clock pulses, the relay will be released and the circuit through its contacts opened.

On switching on to give the power up condition for the receiver the processor makes a check to see if the system driving this relay is functioning fully, the processor waiting on power up for the off condition of the driving system (when the relay is released) and if no such condition is sensed the other functions are not enabled and the system kept hung up.

Once the off condition or state has been sensed, the processor makes a start with the output of the driving pulses for the fatal delay time relay, it then waiting for an on state. If there is then no on state, this is again a reason for not enabling the system.

A further safety measure is the user-enablement of message reception by operation of the key. In fact the only effect of switching to get power up is that the said checking operations for the timing relay take place without so far any processing of a message, something that is only started by pressing a key. In this respect as well monitoring is undertaken to see that the key has in fact been worked, the off signal on the key line not counting as a start.

For stopping interference from other vehicle-mounted concrete pumps on the same carrier frequency, there is a recognition system. When the receiver is turned on, the transmitter will still be turned off. If now messages are received by the receiver, that are only right in form but not in substance, that is to say, in order with respect to the order of the preamble and data bits, enablement of the receiver by pressing the start key is not permitted and for this reason it will not be possible for the commands coming from another transmitter in operation (for example, such a transmitter used with another concrete pump as noted hereinbefore) to be acted upon. It is only when the receiver logic has recognized the RF channel as being "free" (that is to say without any message-like exchange of bits) that enablement by using the start key becomes possible. The transmitter then has to be turned on within a time of 30 seconds in order to keep the enablement in force.

The control function is however only started when within a time of 30 seconds a message (that is to say two-part messages) with the information "everything in neutral" has been recognized. If this is not the case and if a message with active information is recognized, the receiver goes back into the hold state and may then only be started by pressing the key thereon, the transmitter being in the turned off state.

The effect of this system of working is that the start of an operation (with all the control elements in the neutral condition) has to be positive and defined.

After transmission has been started following this prescribed, regular procedure and processing of information at the receiving end is under way, as detailed in the part of the present account on transmission, messages with a defined content are awaited. Any trouble condition in the transmission-reception path for longer than 0.8 second will be responsible for all the relays being turned off so that all functions will be non-operational. If the trouble condition goes on for longer than 30 seconds the system will take it that operation is ended and goes into the hold state (in which as well all relays are turned off), such hold state being ended by operation of a key on the receiver in keeping with the prescribed procedure for starting up or making a cold start, that is to say with the transmitter turned off.

As will be seen from this account so far, an important useful effect of the present invention is that radio transmission of signals, most importantly, gives the greatest possible degree of safety for the operation, for the function and for the life and limb of the worker using the system. More specially, a key effect of the invention is that there will be no trouble conditions caused by transmitters with radio control channels whose carrier frequencies are same as that of the system of the invention. Such trouble is made impossible because of the message encoding. If there is interference on the carrier frequency, then because of the message encoding procedure, operation of the system will be shut down fully rather than going on operating with glitsches in the form of the wrong functions being caused.

In the case of such an emergency in which radio communication is not possible and it is still necessary for the hydraulic system to be worked, the light guide 39 may be used as a connection between the transmitter and the receiver. By linking up the message processing or encoding unit 50 (see FIG. 7) at the operator's end with the message decoding part (see FIG. 6) at the receiving end using an electrically insulating light guide cable 39 with the light guide transmitter 52 and the light guide receiver (see FIG. 2) placed between the two ends of the system, the transmission of messages will be possible, with the same safety measures, in place of using the radio link.

Because this connection may be made simply by plugging in the light guide cable 11 and 10 and 13 (see FIG. 1) without changing the components otherwise need for the RF link, the same assemblies may be used.

The cable remote control 11 may, but does not have to be, used so that the invention gives the useful effect that in all three forms or modes of transmission are made possible, selection thereof being possible to be in harmony with the conditions on the jobsite.

Figure 6:
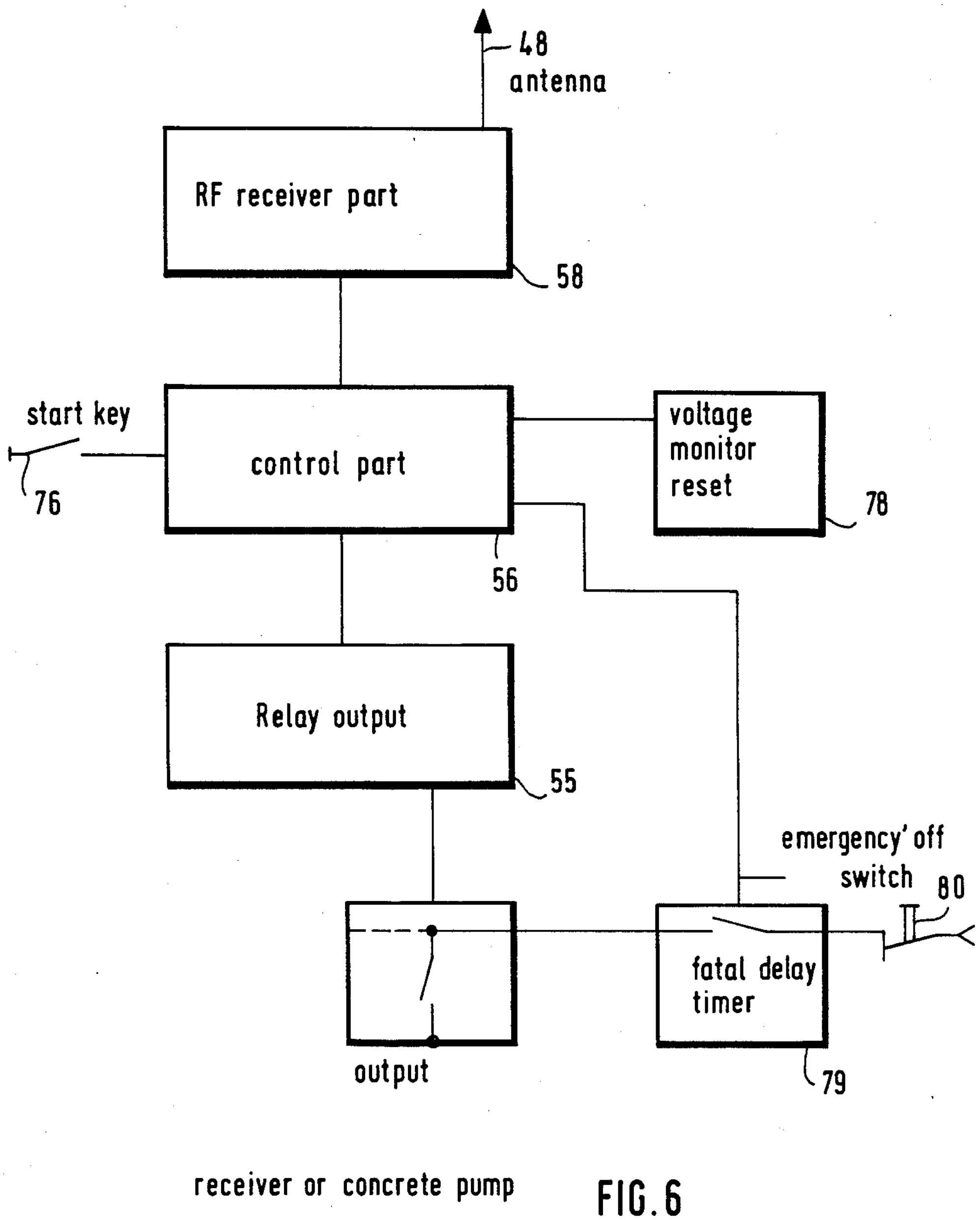
FIG. 6 is a block circuit schematic of the receiver part of a concrete pump.

FIG. 6 is a block schematic of the receiving part of a concrete pump. The antenna 48 (see FIG. 1 on this point) is joined up with the RF receiving part 58 of the receiver 42 (see FIG. 2). The receiving part 58 is joined up with the control part 56 (see FIG. 2 as well), same being able to be turned on and off with the switch 76. As part of the control part there is not only the relay output block 56 (for details thereof see FIG. 2), but furthermore the voltage monitoring and reset block 78 and a fatal delay circuit 79 with an emergency off switch 80 in the connection running back from the circuit 79 to the relay output block.

Figure 7:
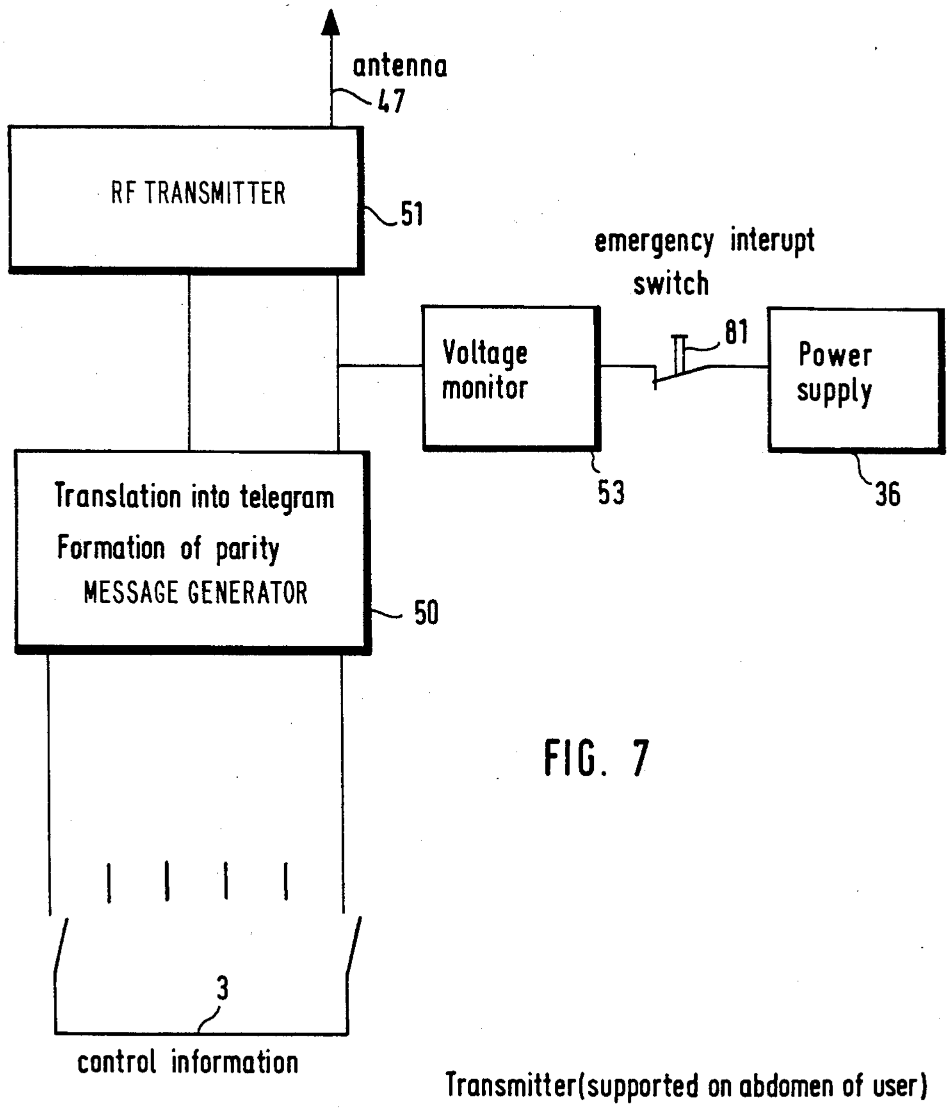
FIG. 7 is a view like that of FIG. 6, but of the transmitter part of the system.

In FIG. 7 the transmitter 2 as in FIG. 1 is to be seen in the form of a block schematic, the antenna of FIG. 1 here being numbered 47. The antenna is mounted on the RF transmitting part 51, that is joined up with the message processing block 50. A terminal is branched off from the connections for the voltage monitoring unit 53, that is joined up by way of the emergency circuit breaker 81 with the outside power supply 36 (see furthermore FIG. 1). The parity forming message processing block 50 gets its control information from the element with the control levers, so that such element is here numbered 3 as well.

I claim:

1. In a remote control system for a construction machine:

a command unit having a number of manually controlled circuits for effecting a number of different control functions;

a multi-pole command unit plug connector, said command unit plug connector being electrically connected to said manually controlled circuits of said command unit, for establishing an electrical connection with said manually controlled circuits;

a transmission unit;

a multi-pole transmission unit plug connector, said transmission unit plug connector being electrically connected to said transmission unit;

a receiver unit having an electrical distributor for generating electrical signals which actuate a plurality of solenoid control valves on a construction machine;

a multi-pole receiver unit plug connector, said receiving unit plug connector being electrically connected to said receiver unit;

a pair of line plug connectors having a line conductor extending therebetween;

whereby said command unit is selectively connected through said plug connectors and said line conductor to one of said transmission unit and said receiver unit to effect wireless and wire remote control of said solenoid valves, respectively;

said transmission unit including means for sending digitally encoded radio frequency messages for each control function which comprise a two-part message continuously transmitted after a connection has been made, such messages each having bits representative of the desired one of said number of control fucntions, address information, and a parity bit for security and mirroring the condition of said circuits of said command unit; and said receiver unit including means for receiving digitally encoded radio frequency messages, a central process controller connected to said means for receiving for receiving and decoding said messages, a D/A converter/amplifier connected to said process controller for converting the output of said process controller into analogue control signals and a plurality of relays connected to said converter/amplifier and responsive to said control signals for actuating a plurality of solenoid control valves on a construction machine.

2. The remote control system of claim 1 wherein said transmission unit further comprises a light guide transmitter; said receiver unit further comprises a light guide receiver; and said line conductor further comprises a light guide for interconnecting the same.

3. The remote control system of claim 1 further comprising a portable transmitter power supply and a receiver power supply connected to said transmitter unit and said receiver unit, respectively, for supplying power thereto, both of said power supplies including a voltage monitor for disabling said power suplies when a low voltage condition is sensed.

4. The remote control system of claim 3 further comprising a fatal delay timer connected to said receiver for disabling said receiver unit when said central process controller is inoperative for a predetermined time period; and an emergency switch connected to said transmission unit for selectively manually disabling said transmission unit.

* * * * *